US009113397B2

United States Patent
Horikoshi et al.

(10) Patent No.: US 9,113,397 B2
(45) Date of Patent: Aug. 18, 2015

(54) APPARATUS AND METHOD FOR DETECTING A WIRELESS ACCESS POINT FOR WIRELESS NETWORK COMMUNICATION

(75) Inventors: Hideto Horikoshi, Sagamihara (JP); Shigefumi Odaohhara, Yamato (JP)

(73) Assignee: LENOVO (SINGAPORE) PTE LTD., Singapore (SG)

(*) Notice: Subject to any disclaimer, the term of this patent is extended or adjusted under 35 U.S.C. 154(b) by 1002 days.

(21) Appl. No.: 11/298,243

(22) Filed: Dec. 9, 2005

(65) Prior Publication Data

US 2006/0128415 A1 Jun. 15, 2006

(30) Foreign Application Priority Data

Dec. 9, 2004 (JP) ................. 2004-357037

(51) Int. Cl.
| H04M 1/00 | (2006.01) |
| H04W 48/16 | (2009.01) |
| H04W 24/00 | (2009.01) |
| H04W 88/08 | (2009.01) |
| H04W 52/02 | (2009.01) |

(52) U.S. Cl.
CPC .............. H04W 48/16 (2013.01); *H04W 24/00* (2013.01); *H04W 52/028* (2013.01); *H04W 52/0229* (2013.01); *H04W 52/0254* (2013.01); *H04W 88/08* (2013.01)

(58) Field of Classification Search
USPC ................ 455/436, 437, 438, 439, 442, 13.4, 455/552.1, 343.1, 343.2; 370/311, 331, 338
See application file for complete search history.

(56) References Cited

U.S. PATENT DOCUMENTS

| 4,615,599 | A | * | 10/1986 | Kataoka et al. ............... 396/157 |
| RE36,712 | E | * | 5/2000 | Sato et al. ...................... 455/574 |
| 6,760,850 | B1 | * | 7/2004 | Atkinson et al. .............. 713/320 |
| 6,850,103 | B2 | * | 2/2005 | Ikeno et al. .................... 327/202 |
| 2003/0011405 | A1 | * | 1/2003 | Ishii et al. ........................ 326/83 |
| 2003/0067818 | A1 | * | 4/2003 | Hirano .......................... 365/200 |
| 2004/0150611 | A1 | * | 8/2004 | Tanaka .......................... 345/100 |
| 2007/0253395 | A1 | * | 11/2007 | Graves et al. ................. 370/338 |
| 2007/0277047 | A1 | * | 11/2007 | Mehta et al. .................. 713/300 |

FOREIGN PATENT DOCUMENTS

| JP | 2001-028836 | 1/2001 |
| JP | 2002-281044 | 9/2002 |
| JP | 2003-108271 | 4/2003 |
| JP | 2004-056817 | 2/2004 |
| JP | 2004-180115 | 6/2004 |
| JP | 2005-057428 | 3/2005 |

* cited by examiner

*Primary Examiner* — Dai A Phuong

(74) *Attorney, Agent, or Firm* — Antony P. Ng; Russell Ng PLLC

(57) ABSTRACT

A wireless network communication card usable with a host apparatus is disclosed. The wireless network communication card includes an access point detection circuit that detects a wireless access point through a wireless antenna. A power inlet to which power is supplied in response to an access point detection request from a user when the power of the host apparatus is suspended, the power inlet being connected to the access point detection circuit is included, as is an indicator coupled to said access point detection circuit that indicates a presence of an available wireless access point in response to a detection by said access point detection circuit.

3 Claims, 7 Drawing Sheets

APPARATUS AND METHOD FOR DETECTING A WIRELESS ACCESS POINT FOR WIRELESS NETWORK COMMUNICATION

PRIORITY CLAM

This application claims priority of Japanese patent application No. JP 2004-357037, filed on Dec. 9, 2004, and entitled, "Wireless Network Communication Card, Apparatus Incorporating Said Card, Apparatus for Supporting Wireless Network Communication, and Method of Detecting Wireless Network Communication.".

BACKGROUND OF THE INVENTION

1. Technical Field

The present invention relates to wireless network communication and an apparatus for supporting wireless network communication. Furthermore, the present invention relates to a method for detecting a wireless access point for wireless network communication from an apparatus having an access detection circuit.

2. Description of the Related Art

With popularization of the wireless LAN, it has become feasible to connect to the Internet at any place accessible through a wireless Access Point (AP) using a mobile computer, including a notebook-type personal computer (notebook PC) or a Personal Digital Assistant. In addition, public wireless LAN access point called hot spots (a registered trademark of NTT Communications Corporation), have become popular. Therefore, many opportunities to access the Internet exist. For example, public wireless LAN access points are placed at hotels, fast food stores, coffee shops, restaurants, stations, air ports, business areas, libraries and other public facilities.

In many cases, the location of an AP is unknown. In order to access an AP from a mobile computer, an operating system (OS), such as Windows (a registered trademark), OS2 (a registered trademark), Mac OS (a registered trademark), Palm OS (a registered trademark) or Windows CE (a registered trademark) is activated, and AP detection is initiated through a function of an OS or application software. This reliance on repeated detection by an OS or applications represents a waste of resources.

Specialized units for detecting AP, such as WiFi Finder by Kensington Company are available. These specialized units create their own inefficiencies.

First, such specialized units do not include means for acquiring AP information (intelligence). That is, these specialized units are simply detectors of ISM RF (industrial, scientific, and medical radio frequency) radiation. The specialized units respond to both legitimate signals (such as IEEE802.11a, IEEE802.11b or IEEE802.11g), and also to RF (radio frequency) radiation emitted from ambient resources, such as a microwave oven or Bluetooth.

Second, even if it is impossible to connect to an AP through the specialized units, it may be possible to connect to the AP through a wireless apparatus of a notebook PC, because the reception sensitivity of the specialized unit is different from the reception sensitivity of the notebook PC. This is a serious problem, which cannot be improved by the specialized unit.

Third, the specialized unit cannot perform AP search with security conditions (access control). Therefore, the specialized unit responds, even to an AP to which a user does not want to connect.

SUMMARY

A wireless network communication card usable with a host apparatus is disclosed. The wireless network communication card includes an access point detection circuit that detects a wireless access point through a wireless antenna. A power inlet to which power is supplied in response to an access point detection request from a user when the power of the host apparatus is suspended, the power inlet being connected to the access point detection circuit is included, as is an indicator coupled to said access point detection circuit that indicates a presence of an available wireless access point in response to a detection by said access point detection circuit.

BACKGROUND OF THE INVENTION

A wireless network communication card usable with a host apparatus is disclosed. The wireless network communication card includes an access point detection circuit that detects a wireless access point through a wireless antenna. A power inlet to which power is supplied in response to an access point detection request from a user when the power of the host apparatus is suspended, the power inlet being connected to the access point detection circuit is included, as is an indicator coupled to said access point detection circuit that indicates a presence of an available wireless access point in response to a detection by said access point detection circuit.

BRIEF DESCRIPTION OF THE FIGURES

FIG. 4 is a circuit diagram of a wireless network communication card when a power supply of a host notebook PC is turned on;

DETAILED DESCRIPTION OF A PREFERRED EMBODIMENT

Figure 1:
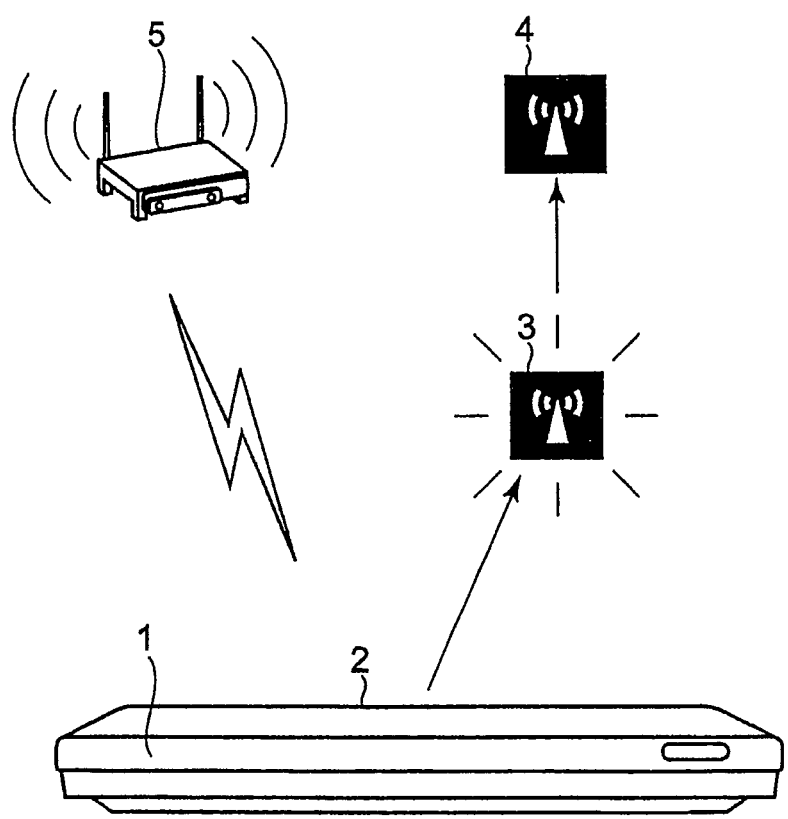
FIG. 1 depicts the positional relationship between an AP and a notebook PC.

The present invention facilitates the detection of a wireless access point from a mobile computer, such as a notebook PC or a PDA, without using a specialized unit for detecting an AP.

The present invention provides a wireless network communication card including an access point detection circuit for detecting a wireless access point through a wireless antenna, wherein the access point detection circuit is provided with a power inlet to which power is supplied in response to an access point detection request from a user during periods when the power of the power supply to a host device is disabled or suspended. The communication card further includes a memory for storing instructions for operating the access point detection circuit in response to the power having been supplied from the power inlet, and transmits an access point detection signal to a detection indicator or a detection sound output unit when the access point detection circuit has detected a wireless access point. The present invention enables detection of a wireless access point without activating the host device.

According to another embodiment of the present invention, the above-mentioned access point detection circuit may include a processor for digital signal processing and a high frequency circuit for wireless communication, and the processor for digital signal processing and the high frequency circuit for wireless communication may be configured within one chip. According to yet another embodiment of the present invention, the above-mentioned access point detection circuit may include a memory for storing instructions to operate the access point detection circuit, in response to power having been supplied from the power inlet, and the memory may be embedded, for example, in the processor for digital signal processing.

Further, the present invention provides an apparatus which incorporates the above-mentioned card, and includes an input means for requesting access point detection and a circuit for providing power to the card, in response to the request the power supply of the host device is turned off or suspended.

The present invention provides an apparatus which can incorporate the above-mentioned card, and includes an input means for requesting access point detection, and a circuit for supplying power to the card, in response to the request when the power to the host device is turned off or suspended.

Further, the present invention provides an apparatus for supporting wireless network communication, which includes a wireless antenna, an access point detection means for detecting a wireless access point through the wireless antenna, an input means for requesting access point detection, a power supply means for supplying power to the access point detection means in response to the access point detection request from a user, means for operating the access point detection means in response to the power having been supplied from the power supply means, and a detection display means or a sound output means for informing to the user that a wireless access point has been detected by operation of the access point detection means, and thereby, enables to detect a wireless access point without activating the host device.

The present invention provides a method of detecting a wireless access point for wireless network communication by using an apparatus provided with an access point detection circuit for detecting a wireless access point through a wireless antenna, which includes a step of supplying power to the access point detection circuit in the state that the power of the apparatus is turned off or suspended in response to an access point detection request from a user, a step of detecting a wireless access point by the access point detection circuit in response to the power having been supplied, and a step of displaying the detection result in a detection indicator or expressing the detection result by sound in case that a wireless access point has been detected, and thereby, enables detection of a wireless access point without activating the apparatus.

Using the present invention, it is not necessary to activate an OS of the host device to ascertain where an AP, such as a public wireless LAN access point, is located, or to respond to detection of an AP in a place distant from the host device, reducing activation time for the OS and improving usability.

Because it is not necessary to activate an OS of the host device, battery power consumption can be saved.

It is possible to search for an AP that will accomodate a security condition (access control). Therefore, it is possible to exclude an ambient radiation such as microwave oven or a beacon of a Bluetooth device. Also, it is possible to exclude detection of an arbitrary access point.

At a time of shipment of a notebook PC with the present invention, an operation confirmation test of the wireless network communication card is possible without installing an OS or a driver for the wireless network communication card. Therefore, it is possible to decrease a testing time during pre-shipment test of the wireless network communication card (efficiency of testing).

It is further possible to use a notebook PC with the present invention for inspecting an AP. Specifically, an AP is unable to perform wireless connection at a place of AP inspection, the present invention enables a determination as to whether the AP is broken (improvement of serviceability).

The present invention addresses the needs of a user who wants to detect an AP. If the user does not know whether or not an AP exists nearby, or even if an AP exists, the user pushes an access point detection request button (AP detection request button) on his mobile computer. If the power of the mobile computer is turned off or suspended (standby, resume), the wireless network communication card and the mobile computer including the card according to the present invention supply power to an access point detection circuit (AP detection circuit) in response to AP detection request from the user. In response to the power having been supplied to the AP detection circuit, the access point detection circuit is activated, and detects the AP. If the AP detection circuit detects the AP, an access point detection signal is sent to a detection display unit, for example, an LED or an LCD, or a detection sound output unit, for example, a speaker. In response to the access point detection signal, the detection display unit provided within the wireless network communication card or an apparatus provided with the card is illuminated, or the detection sound output unit makes a sound. The user then knows that communication with the AP is available through this illumination or the sound. The user may then activate the OS of the mobile computer, and initiate wireless network communication.

The wireless network communication card according to the present invention is loaded in a mobile computer. Also, according to the present invention, a circuit configuration included in the wireless network communication card may be directly embedded in the mobile computer.

A wireless network communication card directly embedded in the mobile computer will reduce manufacturing cost.

The wireless network communication card and the mobile computer according to the present invention may mount an AP search function with a security (certification) prerequisite. By employing the security (certification) condition, it is possible to preliminarily block the detection of an undesired or harmful AP. A function for ignoring, for example, an arbitrary access point such as Rogue AP established for stealing secret information with ill will, is provided in some embodiments. It is possible to preliminarily register an SSID (Service Set Identifier), an ESSID (Extended Service Set Identifier), a BSSID (Basic Service Set Identifier), a MAC (Media Access Control) address, or a WEP (Wired Equipment Privacy) key of an AP, of which detection is allowable, in the AP detection circuit or in a table of the memory connected to AP detection circuit. If a WPA is associated with an AP (Wi-Fi Protected Access), it may use a preliminarily shared (Pre-shared) key instead of a WEP key. This table is preferably preliminarily registered as ROM, however, flash ROM, UV-EPROM (Ultra-Violet Erasable Programmable Read Only Memory), EEPROM (Electrically Erasable Programmable Read Only Memory) or other media may be used to facilitate rewriting.

An example of the certification condition follows. The SSID, MAC address or WEP key from an AP is compared with a AP MAC registration list (wireless access point information) preliminarily registered in the wireless network communication card. If the AP MAC registration list disagrees with the MAC address or the WEP key from the AP, respectively, the user is informed that an AP has not been detected, or that although the AP has been detected, the user cannot be connected to the AP.

Further, for authentication confirmation, an electronic certificate of the AP may be used. The AP electronic certificate includes a digital signature of the certificate authority (publisher) for the AP electronic certificate. By preliminarily acquiring the public key from the certificate authority, and storing the public key in the flash ROM or the EEPROM of the DSP, it is possible to confirm the authentication of the digital signature of the certificate authority in the AP electronic certificate sent from the AP. The DSP that has received a beacon from the AP acquires reliability of the AP by confirming whether or not this AP electronic certificate is authentic. In more detail, by using the public key of the certificate authority preliminarily stored in the flash ROM or the EEPROM of the DSP, the digital signature of the certificate authority in the AP electronic certificate sent from the AP is decoded, and a certificate digest X (hash value X) is obtained. Also, a certificate digest Y (hash value Y) of the AP electric certificate is obtained. If these two hash values X and Y are in conformity, validity of the AP can be confirmed.

The user can preliminarily select a security condition of the AP. Examples of a security condition of the AP follow:

(1) A search mode without a security level is a mode for searching all APs including an arbitrary access point.

(2) A search mode with a security level is a mode for searching the APs preliminarily registered to be connected. The following conditions are assigned:
  a) SSID/WEP of the AP is preliminarily conditionally assigned.
  b) A MAC address of the AP is preliminarily conditionally assigned.
  c) A preliminarily shared key of the AP (in case that the AP supports a WPA) is preliminarily conditionally assigned.
  d) The AP placed in a location registered to the location profile (Location Profile: setting for every location to use) assigned by the communication connection management program (IBM Access Connection Manager Program) is preliminarily assigned with some conditions.

Further, in order to confirm authentication of the apparatus of the present invention, the IEEE802.1X EAP-TLS (Extensible Authentication Protocol-Transport Level Security) may be used. The IEEE802.1X EAP-TLS is one of the certification technologies in a wireless LAN, in which an electric certificate is possessed by both of a server and a personal computer, and after performing cross certification between the AP and the personal computer by using these certificates, the communication data is encrypted. As a server for certification, a RADIUS (Remote Authentication Dial In User Service) server may be used. The protocol of the IEEE802.1X EAP-TLS using a RADIUS server is described at URL (http://www.ietf.org/rfc/rfc2716.txt).

In detail, the RADIUS server performs the authentication certification of the apparatus of the present invention by using the electric certificate preliminarily stored in the DSP-ROM of the apparatus. The certification of a notebook PC with present invention using the electric certificate is performed in accordance with the following steps, by using the IEEE802.1X EAP-TLS:

1) The DSP requests connection to the AP.
2) The AP sends client certification information from the DSP (including the electric certificate of the client) to the RADIUS server.
3) The RADIUS server performs certification of the client certification information and sends to the AP whether the client certification information is OK.
4) If the certification result from the RADIUS server is OK, the AP establishes a link with the client.

If a registered AP has been found, the present invention may use this discovery as a trigger to send a WAKE# signal to the ICH (I/O Control Hub) of the apparatus body. As a result, the power of the apparatus is automatically turned on. Further, the DSP may create an encryption key session by session and encrypt the data. And the encrypted data may be sent to the AP to start encrypted communication with the AP.

An apparatus incorporating the wireless network communication card of the present invention may be used not only for a purpose of AP detection but also for operation confirmation as to whether or not the card functions properly at a time of shipment of the card or the apparatus incorporating the card. To perform this confirmation, AP that functions normally is prepared, and the AP is located within a range such that radio waves reach the production line of the notebook PC. A tester will then push the AP detection request button while the power is turned off and confirm that the LED on the notebook PC is illuminated. It is thereby possible to confirm that the card is working. Because the apparatus incorporating the wireless network communication card of the present invention does not require instructions from the OS, this test is feasible even if the OS has been installed in the PC.

The configuration and the operation of the wireless network communication card and the apparatus having incorporated the card according to the present invention are described as below based on the accompanying drawings. However, the present invention is not limited to the description. In addition, FIG. 2 through FIG. 5 illustrate an apparatus having incorporated the wireless network communication card. However, a circuit configuration in the card may be preliminarily incorporated into the apparatus.

FIG. 1 shows the positional relationship between an AP and the apparatus having incorporated the wireless network communication card of the present invention. The apparatus having incorporated the wireless network communication 2 card of the present invention is a mobile computer (such as a notebook PC 1 or a PDA). However, the present invention is not limited to this configuration. A car navigation system or a mobile LAN, for example, would fall within the scope of the present invention. In a preferred embodiment, a notebook PC includes at least a LCD, a CPU, a memory, storage apparatus (HDD) and a bus for connecting these. In the storage apparatus, an operating system (OS) such as Windows (a registered trademark), OS2 (a registered trademark) or Mac OS (a registered trademark) is installed. As an example of a PDA, a mobile computer based on Palm OS (a registered trademark) and a mobile computer based on Windows CE (a registered trademark) can be used. In FIG. 1, an AP 5 is illustrated as to be located within a range that a notebook PC 1 can connect to the AP 5, however, the AP 5 is not always located within range of the notebook PC 1.

The AP 5 functioning as a parent station is a connection node of a wireless LAN prepared by a network service provider. As a communication standard for the AP 5, IEEE802.11b and IEEE802.11g, which are international standards for the 2.4 GHz band, and IEEE802.11a, which is an international standard for the 5 GHz band can be used. Further, ESS-ID, which is an identifier of a network in a wireless LAN of the IEEE802.11 series is stored in the AP 5.

The wireless network communication card and the apparatus having incorporated the circuit of the card of the present invention perform an operation, called a scan, by searching for a connectable AP 5. There are two methods for this scan. The first is a passive scan 4 for receiving a beacon (synchronization) signal which is a signal periodically transmitted by the AP 5 for synchronizing a child apparatus and the AP 5. The other is an active scan 3 in which a child apparatus transmits a search packet called as a probe to an indefinite AP 5, and receives a response packet. In the present invention, either method may be used.

Figure 2:
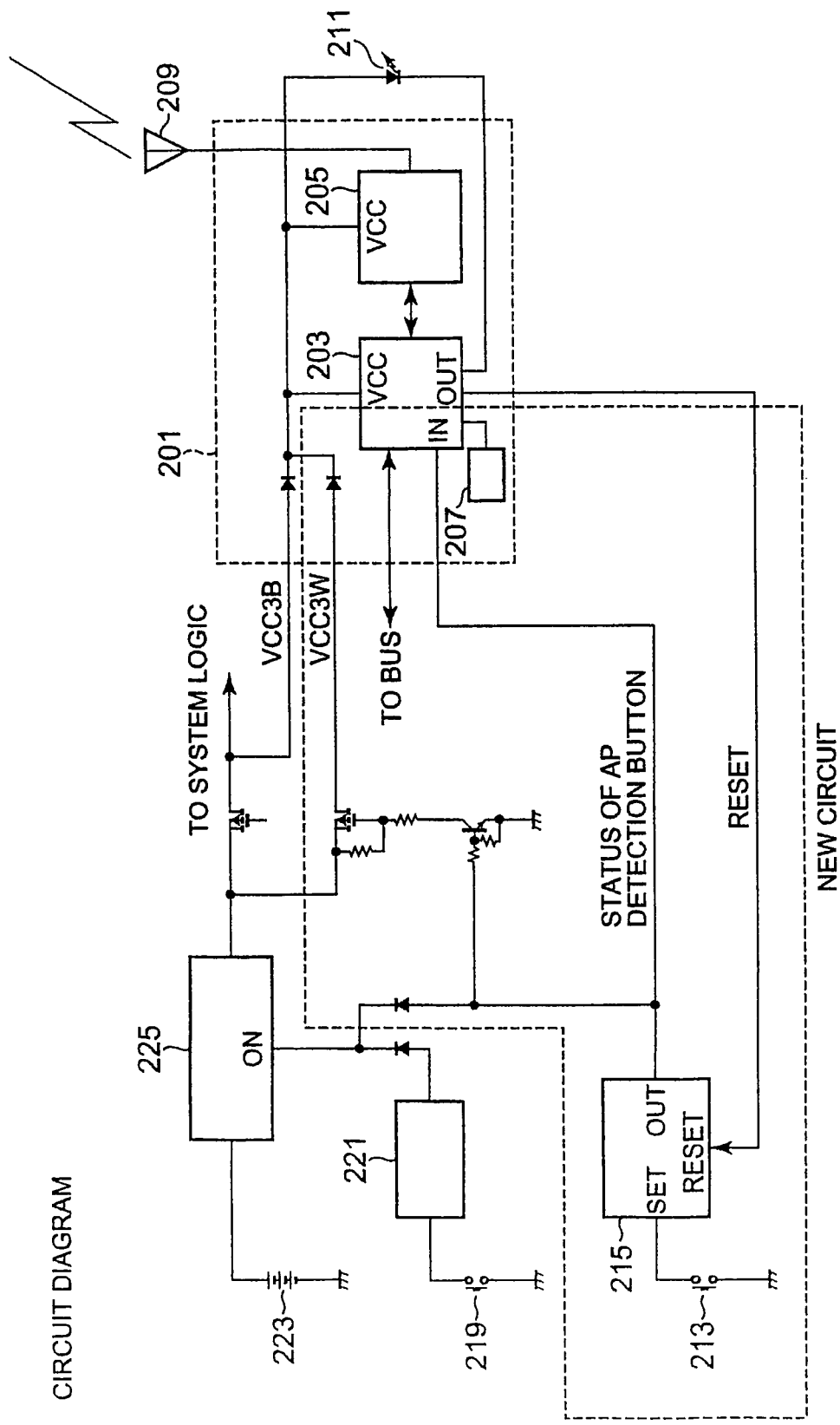
FIG. 2 illustrates a circuit diagram of an apparatus incorporating the wireless network communication card of the present invention.

FIG. 2 illustrates a circuit diagram of the apparatus having incorporated the wireless network communication card of the present invention. The interior of the dotted line encloses equipment added by the present invention. FIG. 2 shows an example, in which the wireless network communication card is connected to the apparatus. However, the wireless network communication card may be directly placed within the apparatus.

The wireless network communication card of the present invention is a card based on the standard of, for example, a PCMCIA card, a compact flash (a registered trademark) card, a mini PCI card or a PCI express mini card. The wireless network communication card is configured to be loadable (connectable) to a PCMCIA card slot, a compact flash (registered trademark) slot, a mini PCI card slot or a PCI express mini card slot, respectively.

The wireless network communication card 201 includes Vcc3B for supplying a power source to the wireless network communication card in the state that the main power source switch 219 of the apparatus in which the card should be loaded is turned on, such that the AP detection circuits (203, 205) connected to the Vcc3B, and a wireless antenna (RF antenna) 209 (optional) are connected to the AP detection circuit.

The Vcc3B supplies power to the AP detection circuit from a battery 223 through a DC-DC converter 225 and the Vcc3B by turning on the main power source switch 219. However, if the main power source is turned off or suspended, power is not supplied to the AP detection circuit from the Vcc3B. Therefore, if the main power source is turned off or suspended, power is not supplied to the AP 5 detection circuit.

The AP 5 detection circuit has an interface with the CPU of the notebook PC in the MAC (Media Access Control) layer which is a lower sub layer of the data link layer protocol. The AP 5 detection circuit has a processor circuit for performing a digital signal processing and a high radio frequency circuit for wireless communication. The AP 5 detection circuit may be configured in one chip, or may be configured with two chips, a DSP chip and an RF chip. The DSP chip converts a digital signal to an analogue signal. The RF chip supports the wireless LAN in the 2.4 GHz band based on the international standard IEEE802.11b or the international standard IEEE802.11g, or the wireless LAN in the 5 GHz band based on the international standard IEEE802.11a or the international standard IEEE802.11n, and performs communication with the AP 5 through the wireless antenna.

The RF antenna is connected to the AP 5 detection circuit or the RF circuit. The RF antenna is integrated with or connected to the wireless network communication card through an antenna connector. As an example of connection through an antenna connector, the antenna may be configured so that the RF (Radio Frequency) signal is propagated through a coaxial cable from the antenna connector. An antenna may also be installed on the chassis of the notebook PC, for example, on the side face of the display panel.

Figure 6:
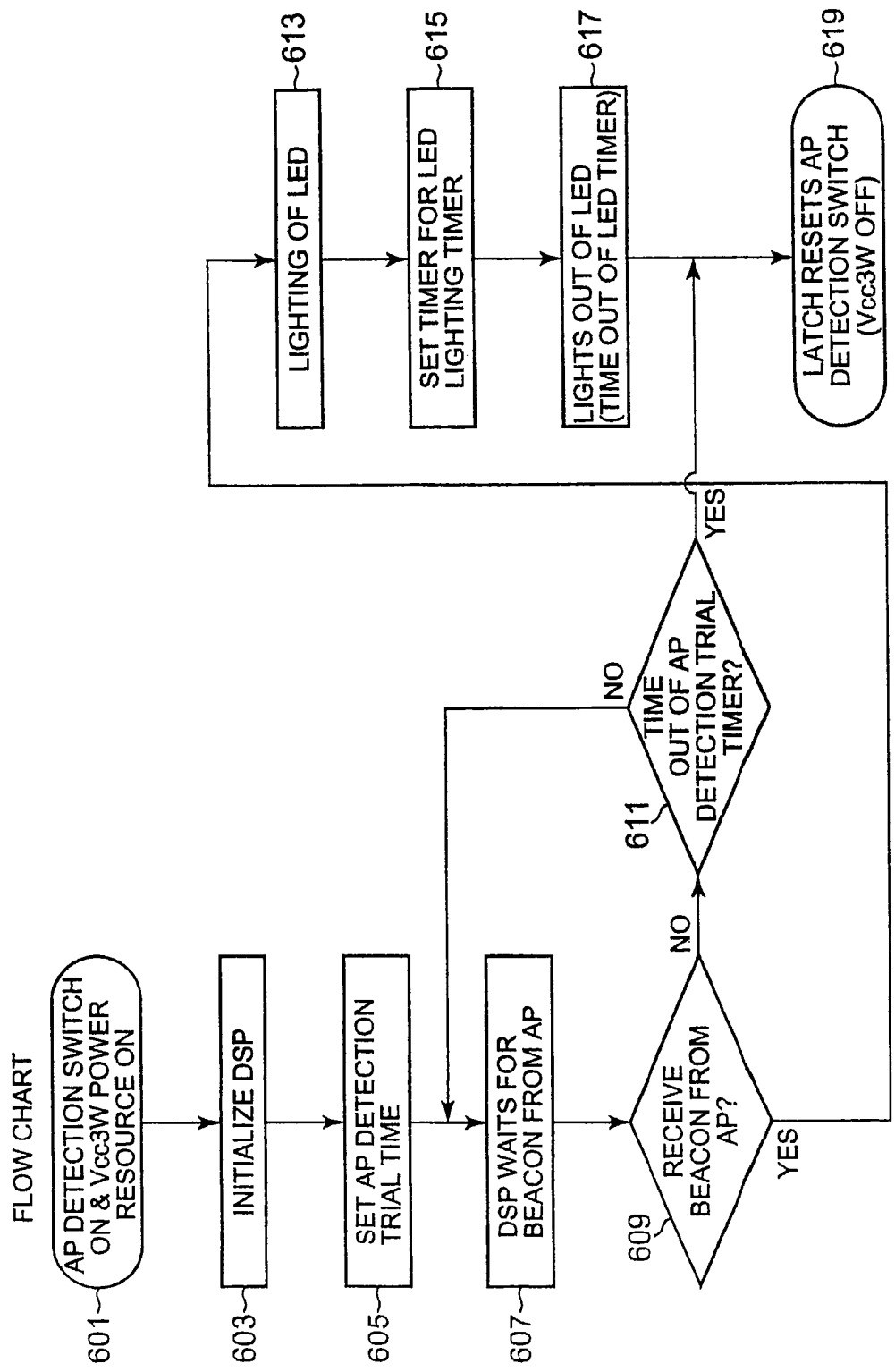
FIG. 6 is a flow chart of firmware stored in the DSP-ROM in accordance with the present invention.

The DSP-ROM is connected to the AP detection circuit or the DSP. A firmware, the contents of which will be discussed in FIG. 6 is stored in the DSP-ROM. The DSP-ROM may be a nonvolatile memory such as flash ROM, UV-EPROM or EEPROM. The firmware can be rewritten, if necessary. Also, the firmware of the DSP-ROM may be preliminarily stored in the AP detection circuit or the DSP.

Next, the wireless network communication card of the present invention receives a signal from a latch circuit 215 if the power source of the apparatus in which the card should be installed is turned off or suspended, and in response to an access point detection request from a user, and thereby, a switch between the DC-DC converter 225 and the Vcc3W is turned on. As the result, power is supplied from the battery 233 to the AP detection circuit through the DC-DC converter 225 and the Vcc3W.

The notebook PC includes the AP detection request button 213, the latch circuit 215 and the LED 211. The AP detection request button 213 may be located at any of an upper surface, a back surface, a right or left surface, a front surface or a rear surface of the notebook PC. Or if the notebook PC is opened, the AP detection request button 213 may be located at any of an upper, a lower, a left or a right side of the LCD, or at any of an upper, a lower, a left or a right side of the keyboard. The AP detection request button 213 may be either a push switch button or a slide button. The latch circuit makes the switch between the DC-DC converter 225 and the Vcc3W to turn on by receiving a signal from the AP detection request button 213. This ensures that power is supplied to the AP detection circuit from the Vcc3W.

Figure 3A:
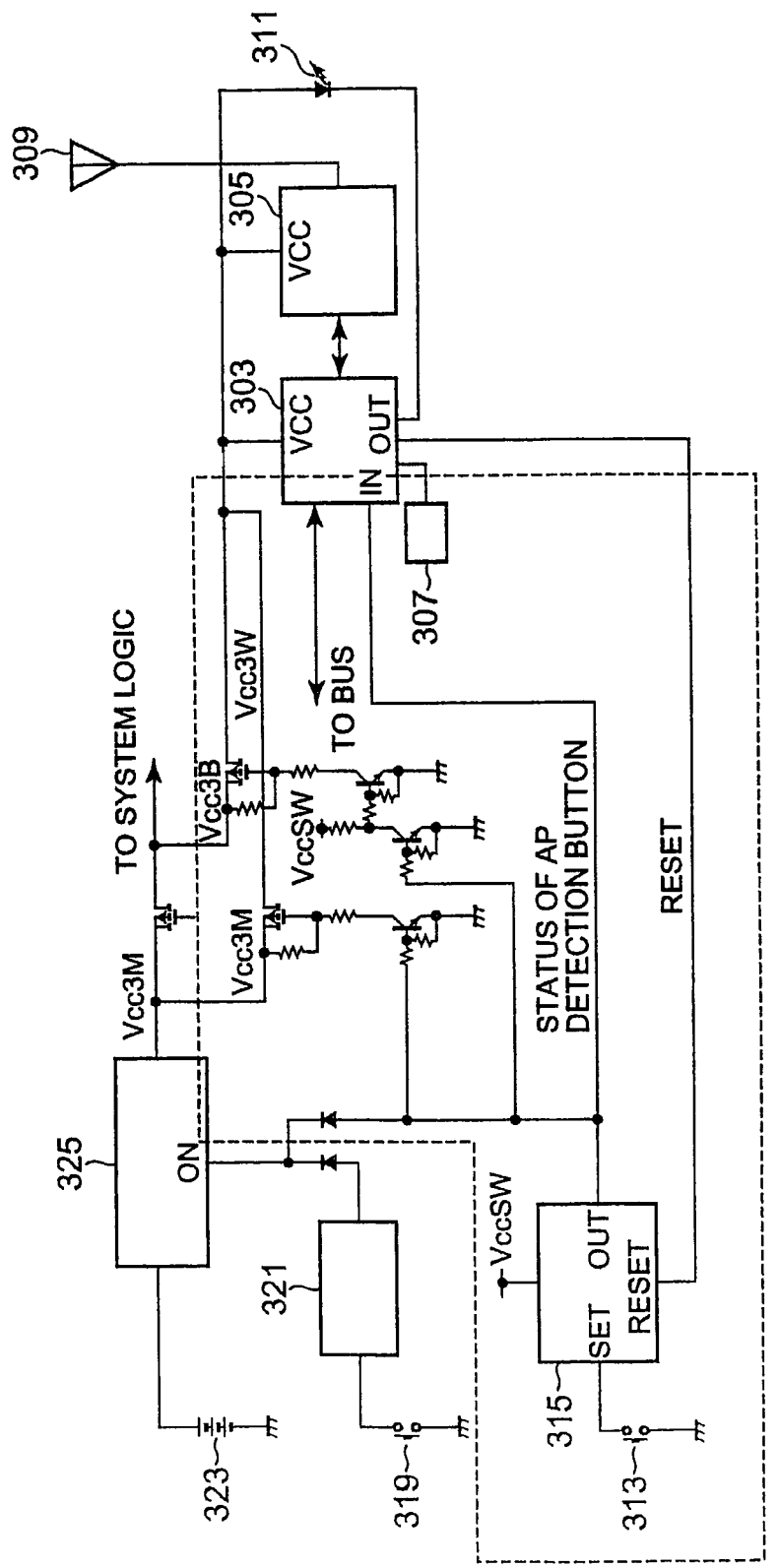
FIG. 3A depicts a circuit diagram of a first embodiment apparatus incorporating the wireless network communication card of the present invention.

FIG. 3A depicts another circuit diagram showing an alternative embodiment of the apparatus having incorporated the wireless network communication card of the present invention. A switch is installed between the Vcc3M from the battery and the Vcc3B. The switch is controlled by the latch circuit 315 through an inverter transistor circuit having the VccSW as a power source. This ensures that in case that the AP detection request button is pushed, the switch between the Vcc3M and the Vcc3B is turned off by the inverter transistor circuit having the VccSW as a power source, and thereby, power is supplied to the access point detection circuit from the Vcc3W. Here, the VccSW is a power source to which power is continuously supplied from the battery regardless of whether the main power switch of the PC body is turned on or off.

Figure 3B:
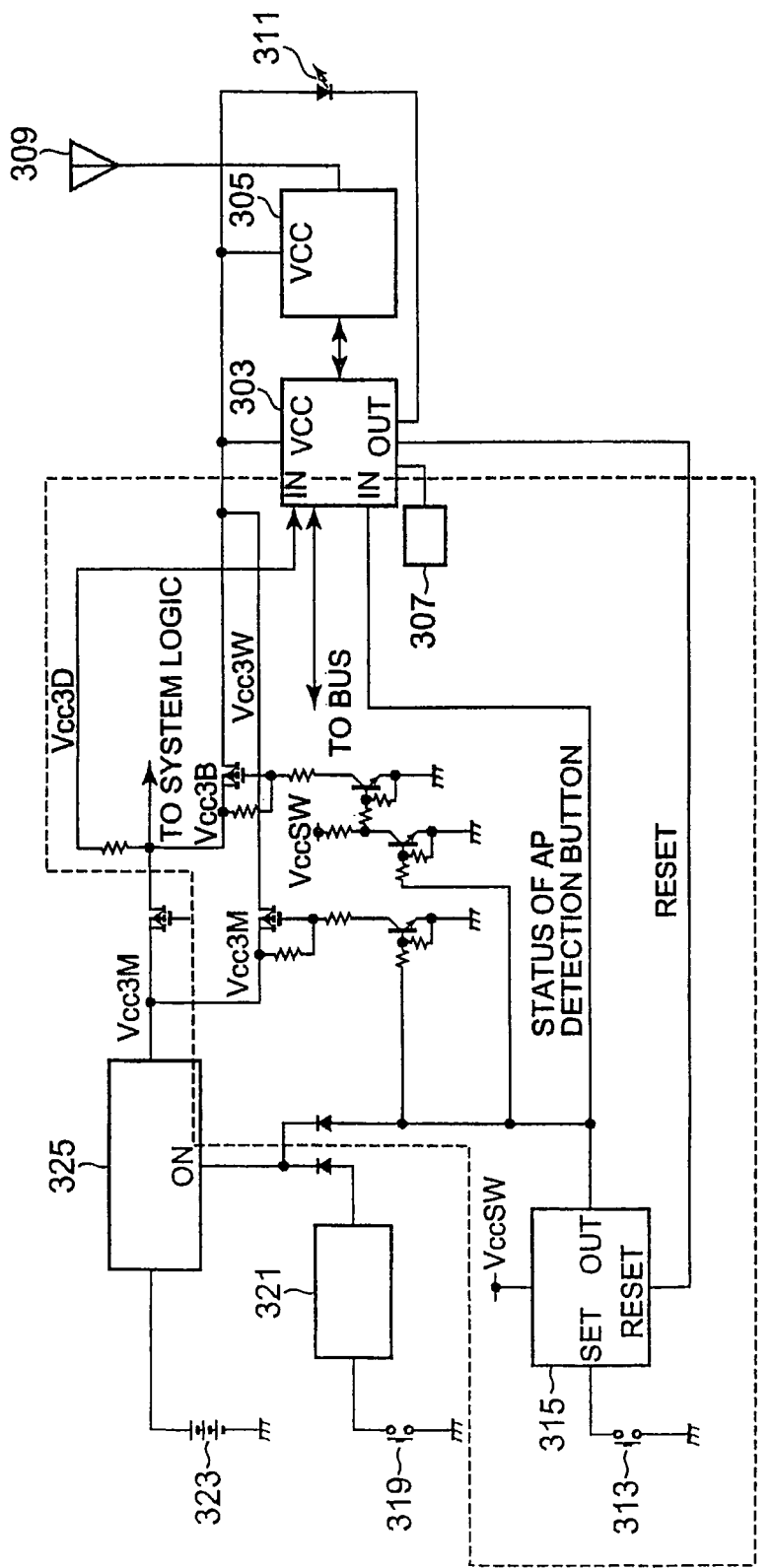
FIG. 3B is a circuit diagram of a second embodiment of an apparatus incorporating the wireless network communication card of the present invention.

FIG. 3B illustrates a diagram of a circuit constituted by adding a Vcc3D to the circuit of FIG. 3A. The Vcc3D is utilized to read the status of the Vcc3B by the DSP. By utilizing the Vcc3D, the DSP disables the AP detection request button if the main power source of the apparatus is turned on, and it enables the AP detection request button if the main power source of the apparatus is turned off.

Figure 4:
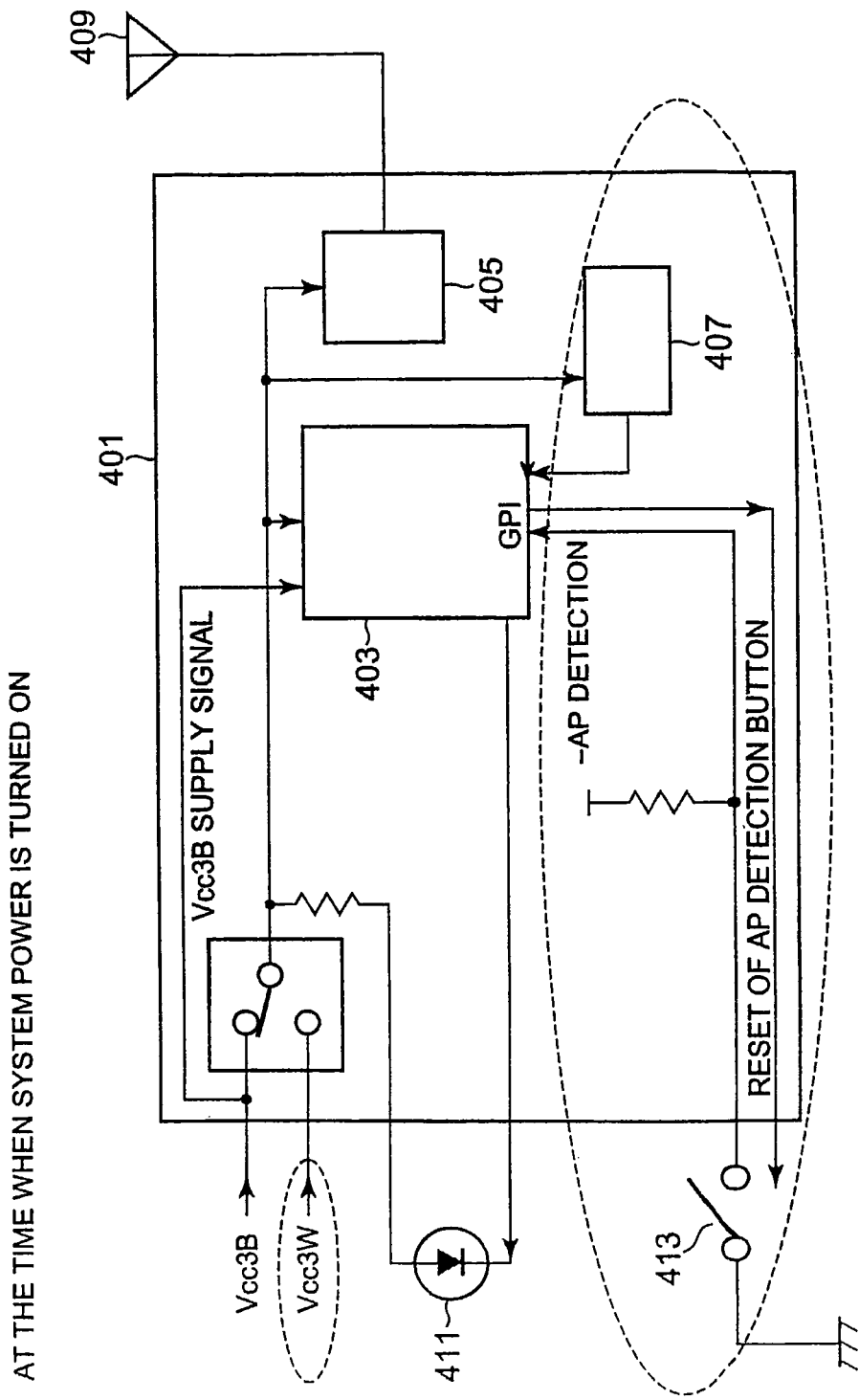

FIG. 4 depicts a circuit diagram of the wireless network communication card if the main power source of the apparatus is turned on. The part enclosed with a dotted line is a configuration added according to the present invention.

The Vcc3B and the Vcc3W are connected to the AP detection circuit (DSP, RF) as a single power supply source through a switch in the card. If the main power source of the apparatus is turned on, the switch turns its way to the Vcc3B side. Therefore, power to the AP detection circuit is supplied from the Vcc3B. If the main power source of the apparatus is turned on, a Vcc3B supply signal may be connected to the DSP through a wiring shown in FIG. 4, so that the switch may not be changed from the Vcc3B to the Vcc3W by the AP detection request button having been pushed. By this wiring, the AP detection request button is disabled by the AP detection circuit.

Figure 5:
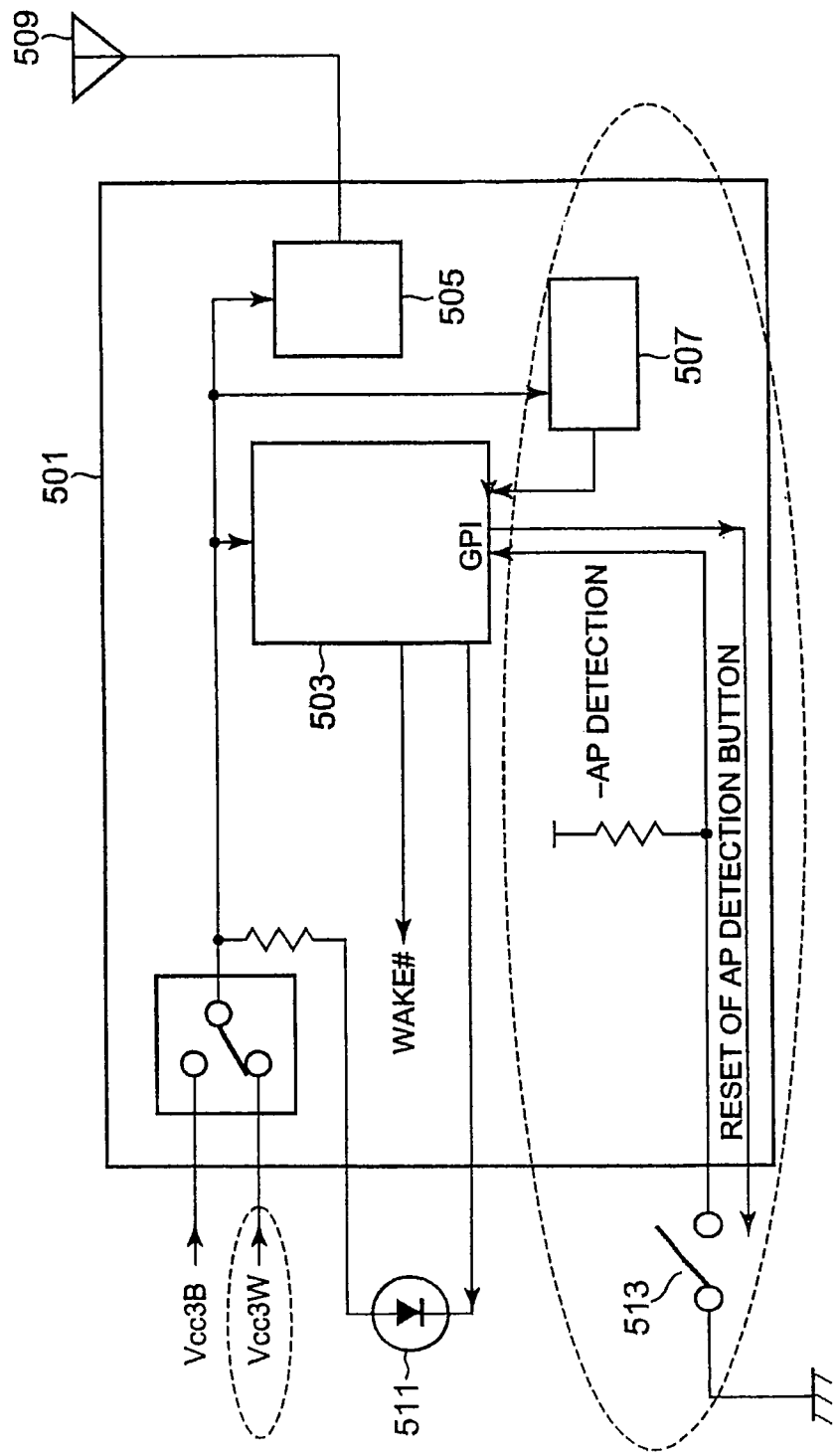
FIG. 5 is a circuit diagram of the wireless network communication card when a power supply of a host notebook PC is turned off or suspended.

FIG. 5 is a circuit diagram of the wireless network communication card if the main power source of the apparatus is turned off or suspended (standby). The part enclosed with a dotted line is a configuration added according to the present invention.

A user wants to detect an AP 5. Because the main power source of the apparatus is turned off or suspended, power has not been supplied to the AP detection circuit. The user pushes the AP detection request button 213 on the apparatus. In response to the access point detection request, the switch between the DC-DC converter 225 and the Vcc3W turns on by receiving a signal from the latch circuit 215. As the result, power is supplied to the AP detection circuit from the battery 223 through the DC-DC converter 225 and the Vcc3W. Next, if the DSP-ROM storing the firmware (instructions) described in FIG. 6 is connected to the AP detection circuit, the AP detection circuit enables to load the instructions from the DSP-ROM in response to the power having been supplied. Subsequently, the AP detection circuit waits for a beacon from an AP. When a beacon from an AP is received, the AP detection circuit sends the access point detection signal to the detection indicator or the detection sound output unit.

As for the detection indicator, a LED or a LCD can be used. If an LED is used, it illuminates (e.g. green) or flashes in response to detection of the AP 5. If the AP 5 cannot be detected, the LED remains dark, or turns on with a preset color (e.g. red) or flashes. Or the LED may change color according to the strength of the electric wave from the AP 5. The detection indicator turns off the light after a time being set to the timer in the AP detection circuit has passed. If an LCD is used, the LCD displays or flashes a word, for example, "AP" in response to the AP 5 having been detected. In case that an AP 5 cannot be detected, a word, for example, "noAP" is displayed or flashed.

Further, the LED can change its color according to difference of the security condition of the AP. The LED displays, for example, "green" if the AP meeting the security condition has been detected, and displays "orange" if the AP not meeting the security condition has been detected.

As for the means for generating sound, a speaker can be provided. The speaker emits a preset sound, for example, a beep, in response to an AP 5 having been detected. If an AP has not been detected, the speaker does not emit a sound or emits a sound having a different frequency. The means for generating a sound is silenced after a fixed interrupt has passed.

Further, the AP detection circuit sends a signal for resetting the AP detection request button to, for example, the latch circuit, after the time being set to the timer has passed. The latch circuit, by receiving the resetting signal, makes the switch between the Vcc3W and the AP detection circuit to turn off and terminates power supply to the AP detection circuit.

Preferably, the latch circuit, by receiving the resetting signal from the DSP, switches the power path from the Vcc3W to the Vcc3B. At the same time of the switching, the DSP may send a WAKE# signal to the ICH (I/O Control Hub) of the apparatus, for example, the notebook PC, and thereby, activate the notebook PC and its OS. The ICH is an Intel ICH chip, for example, a south bridge.

FIG. 6 provides a flowchart of an example of the firmware stored in the DSP-ROM or the AP detection circuit.

In step 601, in response to the AP detection request button mounted on the notebook PC having been pushed, power is supplied to the DSP from the Vcc3W power source.

In step 603, the DSP is initialized.

In step 605, a trial time for detecting an AP is set. It is possible to preliminarily set an optional time such as 30 seconds to 1 minute for the trial time, as an initial value. However, a user can optionally change the trial time.

In step 607, the DSP waits for a beacon from an AP 5.

In step 609, whether or not a beacon from an AP has been received is confirmed. If it has received a beacon from the AP 5, the flow goes to the step 613, and if it has not received a beacon during a certain period of time, the flow goes to the step 611.

In case that a beacon from the AP 5 has been received, the flow proceeds to the following steps.

In step 613, the LED on the notebook PC is turned on, in response to a beacon from the AP having been received. If necessary, the AP detection circuit confirms that the detected AP is the wireless access point registered to the AP detection circuit, by using wireless access point information from the detected AP, before turning on the LED. As a result of the confirmation, if the AP is connectable, LED is turned on.

In step 615, the time when the LED is lighted up is set by a timer. This step is optional, and an optional time, for example, such as 10 seconds to 30 seconds may preliminarily be set as an initial value or depending on a user.

In step 617, after the time being set by the timer has passed, the LED is turned off.

In step 619, the latch circuit is reset. The switch of Vcc3W is turned off.

In case that a beacon from an AP has not been received, the flow proceeds to the following steps.

In step 611, until the AP detection trial time passes over a preset time, for example, 30 seconds to 1 minute, the flow returns back to the step 607 (No). After the AP detection trial time has passed over the preset time, the flow proceeds to the step 619 (Yes).

In step 619, the latch turns off the switch of Vcc3W, and resets the AP detection switch.

While the invention has been particularly shown and described with reference to a preferred embodiment, it will be understood by those skilled in the art that various changes in form and detail may be made therein without departing from the spirit and scope of the invention.

What is claimed is:

1. A host computer comprising:
a wireless network communication card having an access point detection circuit for detecting a wireless access point, wherein said access point detection circuit is capable of being powered by a main power source or a battery power source, wherein said wireless network communication card further includes a memory device for storing instructions to operate said access point detection circuit without activating an operating system of said host computer;
an access point detection request button, coupled to a latch circuit of said wireless network communication card, controls a switch between said main power source and said battery power source such that power is provided to said access point detection circuit from said battery power source regardless of whether or not said main power source from said host computer is available, after said access point detection request button has been activated, wherein said switch is controlled by said latch circuit via an inverter transistor circuit; and an indicator, coupled to said access point detection circuit, for indicating a presence of an available wireless access point in response to a detection of said wireless access point by said access point detection circuit.

2. The host computer of claim 1, wherein said access point detection circuit detects communication security by using wireless access point information from said detected wireless access point.

3. The host computer of claim 1, wherein said access point detection request button is activated by a user.

\* \* \* \* \*